US010511000B2

(12) United States Patent
Cho (10) Patent No.: US 10,511,000 B2
(45) Date of Patent: Dec. 17, 2019

(54) BATTERY PACK

(71) Applicant: SAMSUNG SDI CO., LTD., Yongin-si, Gyeonggi-do (KR)

(72) Inventor: Man Sik Cho, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 338 days.

(21) Appl. No.: 15/386,417

(22) Filed: Dec. 21, 2016

(65) Prior Publication Data

US 2017/0187012 A1    Jun. 29, 2017

(30) Foreign Application Priority Data

Dec. 29, 2015   (KR) .................. 10-2015-0188097

(51) Int. Cl.
*H01M 2/10* (2006.01)
*H01M 2/20* (2006.01)
*H01M 10/0525* (2010.01)

(52) U.S. Cl.
CPC ........... *H01M 2/105* (2013.01); *H01M 2/204* (2013.01); *H01M 10/0525* (2013.01); *H01M 2220/30* (2013.01)

(58) Field of Classification Search
CPC ... H01M 2/105; H01M 2/204; H01M 10/0525
See application file for complete search history.

(56) References Cited

U.S. PATENT DOCUMENTS

| | | | | |
|---|---|---|---|---|
| 5,965,292 A * | 10/1999 | Kim | ...................... | H01M 2/204 429/121 |
| 2007/0111087 A1* | 5/2007 | Tsai | ...................... | H01M 2/105 429/100 |
| 2011/0052939 A1* | 3/2011 | Kim | ...................... | H01M 2/105 429/7 |
| 2011/0059352 A1* | 3/2011 | Lee | ..................... | H01M 2/0202 429/164 |
| 2016/0285069 A1* | 9/2016 | Jeon | .................... | H01M 2/0275 |

FOREIGN PATENT DOCUMENTS

| KR | 10-2009-0020177 A | 2/2009 | |
|---|---|---|---|
| KR | 10-2013-0005756 A | 1/2013 | |
| WO | WO-2015083912 A1 * | 6/2015 | .......... H01M 2/0275 |

* cited by examiner

*Primary Examiner* — Jimmy Vo
(74) *Attorney, Agent, or Firm* — Lee & Morse, P.C.

(57) ABSTRACT

A battery pack includes a battery with an electrode terminal connected to a lead tab, a metal holder to accommodate the battery, and an insulating holder spacing apart the metal holder from the battery, the insulating holder including a coupling part coupled with the metal holder, and the lead tab being connected to electrode terminal through an opening in the insulating holder.

17 Claims, 7 Drawing Sheets

BATTERY PACK

CROSS-REFERENCE TO RELATED APPLICATION

Korean Patent Application No. 10-2015-0188097, filed on Dec. 29, 2015, in the Korean Intellectual Property Office, and entitled: "Battery Pack," is incorporated by reference herein in its entirety.

BACKGROUND

1. Field

The present disclosure relates to a battery pack, and more particularly, to a battery pack including a secondary battery.

2. Description of the Related Art

In general, a secondary battery is a battery, which is chargeable and dischargeable to be repeatedly usable. The secondary battery may be charged with solar energy and other new generative energy, as well as an existing power system, e.g., a power plant, as an energy source. The secondary battery may be used as an energy source of a vehicle or large equipment requiring a supply of power, as well as an electronic device, e.g., a mobile phone, a notebook computer, or a camcorder.

As necessary, in order to implement a high-output or high capacity power storage device, a plurality of secondary batteries may be connected in series and/or in parallel. Further, as necessary, a controller controlling charging and/or discharging of the secondary battery and preventing overcharging and/or overdischarging of the secondary battery may be further included.

SUMMARY

An embodiment of the present disclosure provides a battery pack, including a battery, a metal holder configured to accommodate the battery; and an insulating holder configured to make the metal holder and the battery be spaced apart from each other, in which the insulating holder includes a coupling part coupled with the metal holder, and is provided with an opening, through which a lead tab connected to an electrode terminal of the battery passes.

The insulating holder may include a space maintaining part inserted between the holder and the battery. The coupling part may include a rib protruding from the space maintaining part to the outside in a radial direction.

The metal holder may have a hole, in which the battery is accommodated. The rib may be coupled to an entrance of the hole.

The metal holder may be provided with a coupling recess, into which the rib is inserted.

The space maintaining part may partially surround an outer peripheral surface of the battery at the least.

The space maintaining part may be provided with one or more incision portions so that an empty space is present between the battery and the metal holder.

The incision portion may extend in a longitudinal direction or a circumferential direction of the battery.

The metal holder may have a hole, in which the battery is accommodated, and an outer surface of the space maintaining part may be in close contact with an inner surface of the hole, in which the battery is accommodated, and an inner surface of the space maintaining part may be in close contact with the battery.

The insulating holder may include a step portion, which extends from the space maintaining part to the outside of the metal holder to define the opening, and of which an outer peripheral edge is larger than a diameter of the hole.

The step portion may be further provided with a guide recess, which communicates with the opening and extends to the outer peripheral edge to the outside in a radial direction, and the lead tab may be accommodated in the opening and the guide recess.

The space maintaining part may have a ring shape communicating with the opening.

The space maintaining part may have a tube shape provided with a first incision portion, which extends in a longitudinal direction of the space maintaining part and communicates with the guide recess.

The space maintaining part may further include a second incision portion extending in a circumferential direction.

The step portions may be provided at one end adjacent to a first electrode terminal of the battery and another end adjacent to a second electrode terminal of the battery, respectively.

The insulating holder may be separately coupled to the hole of the metal holder.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when an element, e.g., a layer, is referred to as being "on" another element or substrate, it can be directly on the other element or substrate, or intervening elements may also be present. Further, it will also be understood that when an element is referred to as being "connected to" another elements, it can be the only element directly connected to the other element, or one or more intervening elements may also be present. In addition, it will also be understood that when a layer is referred to as being "between" two layers, it can be the only layer between the two layers, or one or more intervening layers may also be present. Like reference numerals refer to like elements throughout. Further, an irrelevant part to the present disclosure may be omitted to clarify the description herein below.

Figure 1:
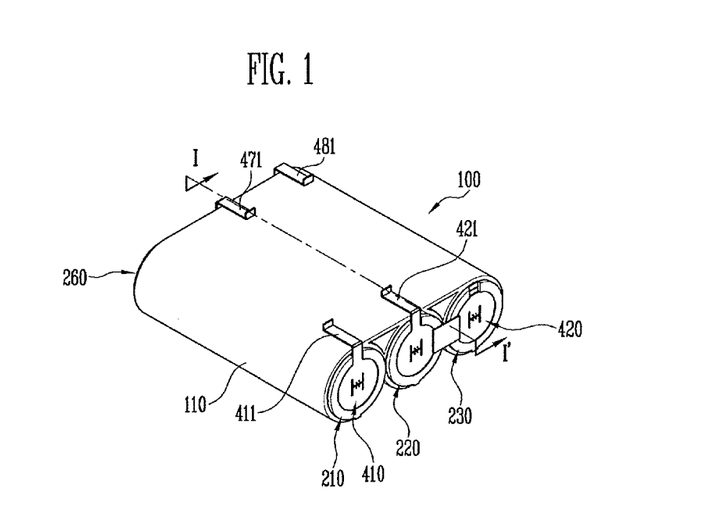
FIG. 1 illustrates a front perspective view of a battery pack according to an embodiment of the present disclosure.
Figure 2:
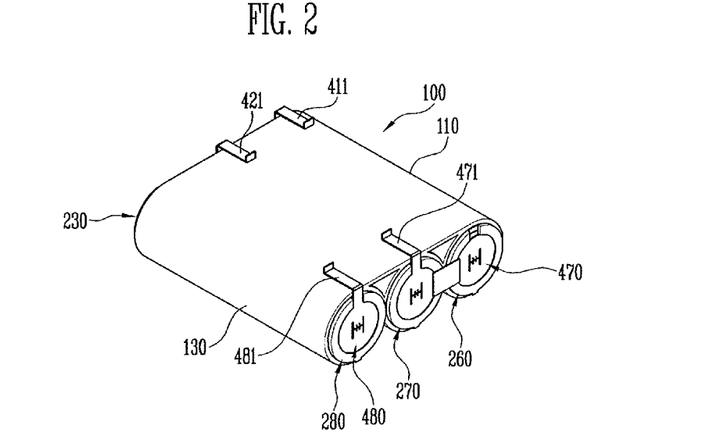
FIG. 2 illustrates a rear perspective view of the battery pack of FIG. 1.
Figure 3:
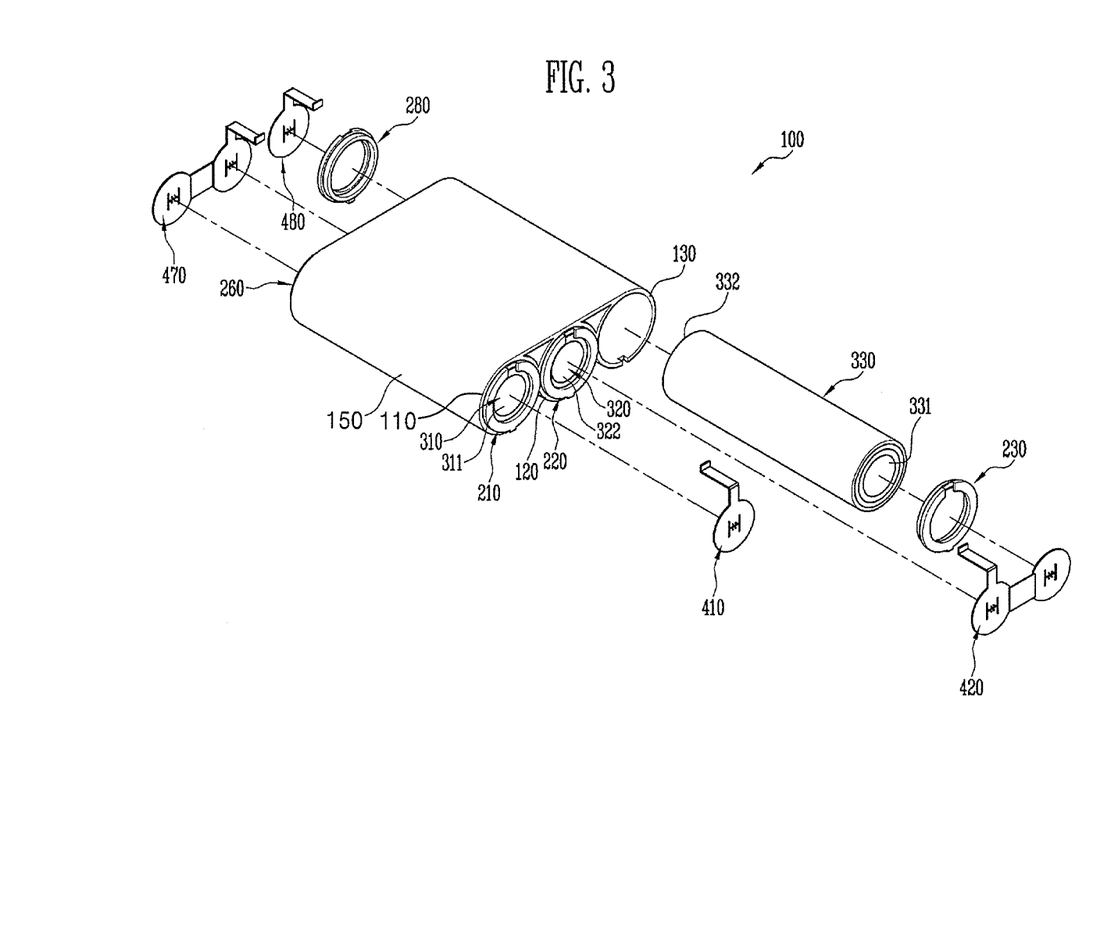
FIG. 3 illustrates a partially exploded perspective view of the battery pack in FIG. 1.

FIG. 1 is a front perspective view a battery pack according to an embodiment of the present disclosure, FIG. 2 is a rear perspective view of the battery pack of the embodiment of FIG. 1, and FIG. 3 is a partially exploded perspective view of the battery pack according the embodiment of FIG. 1.

Referring to FIGS. 1-3, a battery pack according to the embodiment of the present disclosure may include a plurality of batteries, e.g., first through third batteries 310, 320, and 330, a plurality of lead tabs 410, 420, 470, and 480 electrically connecting the plurality of batteries, a metal holder 150 accommodating the plurality of batteries, and a plurality of insulating holders 210, 220, 230, 260, 270, and 280 making the metal holder and the batteries be spaced apart from each other. In the present embodiment, the number of batteries is plural, but the present disclosure is not limited thereto. For example, the spirit of the present disclosure may be applied to a case where one battery is accommodated in the metal holder and the insulating holder is inserted between the battery and the metal holder as a matter of course.

The plurality of batteries 310, 320, and 330 are secondary batteries, which are chargeable and dischargeable several times. The plurality of batteries 310, 320, and 330 is formed by sealing an electrode assembly, in which a separator is interposed between a first electrode plate and a second electrode plate, in a cylindrical can together with an electrolyte. As long as a battery is capable of reacting with an electrolyte and generating electrochemical energy, the battery is acceptable, e.g., the battery may be a lithium polymer battery or a lithium ion battery. A particular configuration of the battery is publicly known, so that a detailed description thereof will be omitted.

The plurality of batteries 310, 320, and 330 includes a first battery 310, a second battery 320, and a third battery 330. The plurality of batteries 310, 320, and 330 substantially has the same configuration. Referring to FIG. 3, the third battery 330 includes a first electrode terminal 331 provided at a first end thereof and a second electrode terminal 332 provided at a second end thereof. The configuration is also identically applied to the first and second batteries.

The first to third batteries 310, 320, and 330 are disposed in parallel, and are serially connected by the plurality of lead tabs. For the serial connection, the first and second batteries are disposed side by side so that a first electrode terminal 311 of the first battery 310 is adjacent to a second electrode terminal 322 of the second battery 320, and a second electrode terminal of the first battery 310 is adjacent to a first electrode terminal of the second battery 320. Further, the third battery 330 is disposed next to the second battery 320 so that a first electrode terminal 331 of the third battery 330 is adjacent to the second electrode terminal 322 of the second battery 320, and a second electrode terminal 332 of the third battery 330 is adjacent to the first electrode terminal of the second battery 320.

The plurality of lead tabs includes a first electrode terminal lead tab 410, a second electrode terminal lead tab 480, a first connection lead tab 470, and a second connection lead tab 420. The first electrode terminal lead tab 410 serves as the first electrode terminal of the plurality of serially connected batteries 310, 320, and 330, and is connected with the first electrode terminal 311 of the first battery 310. The first connection lead tab 470 electrically connects a second electrode of the first battery 310 and a first electrode of the second battery 320. The second connection lead tab 420 electrically connects the second electrode terminal 322 of the second battery 320 and the first electrode terminal 331 of the third battery 330. The second electrode terminal lead tab 480 serves as the second electrode terminal of the plurality of serially connected batteries 330, 320, and 330, and is connected with the second electrode terminal 332 of the third battery 330.

The plurality of lead tabs 410, 420, 470, and 480 includes extended tabs 411, 421, 471, and 481 extended above the metal holder 150, respectively. The extended tabs are inserted into a circuit board while ends of the extended tabs are bent, thereby electrically connecting the plurality of batteries 310, 320, and 330 to the circuit board.

However, the present disclosure is not limited to the case where the plurality of batteries is serially connected, and the spirit of the present disclosure may also be applied to a plurality of batteries connected in parallel. Further, for the parallel connection, the plurality of batteries may be differently disposed from the aforementioned disposition.

Figure 6:
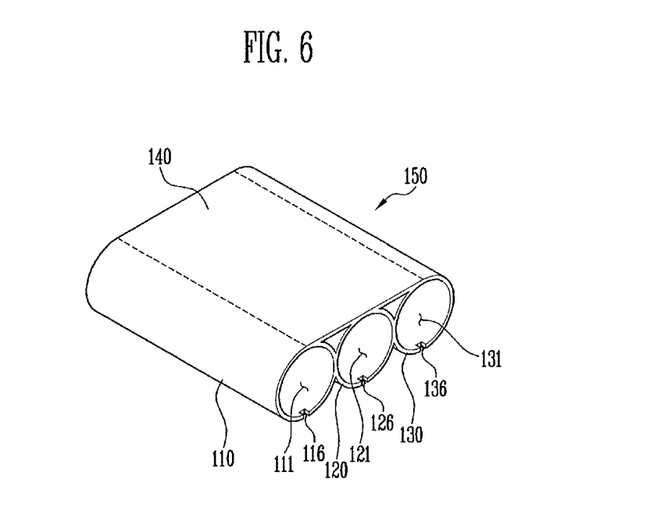
FIG. 6 illustrates a perspective view of the metal holder provided in the embodiment of FIG. 1.

The plurality of batteries 310, 320, and 330 is accommodated in the metal holder 150, as illustrated in FIGS. 3 and 6. Referring to FIG. 6, the metal holder 150 includes a plurality of battery accommodating units, e.g., a first battery accommodating unit 110, a second battery accommodating unit 120, a third battery accommodating unit 130, and a connecting unit 140, which connects the plurality of battery accommodating units, e.g., the first to third battery accommodating units 110 through 130 into one unit. It is noted that a number of battery accommodating units in the metal holder 150 may equal the number of batteries.

The first battery accommodating unit 110 has a tube shape provided with a hole 111, i.e., an opening therethrough, in which the first battery 310 is accommodated. The second battery accommodating unit 120 is disposed next to the first battery accommodating unit 110 side by side, and has a tube shape provided with a hole 121, in which the second battery 320 is accommodated. The third battery accommodating unit 130 is disposed next to the second battery accommodating unit 120 side by side, and has a tube shape provided with a hole 131, in which the third battery 330 is accommodated. Further, the connecting unit 140 has a plate-shaped body, which connects the first to third battery accommodating units 110, 120, and 130 while crossing the first to third battery accommodating units 110, 120, and 130 at an upper side of the metal holder 150.

Diameters of the holes 111, 121, and 131 formed in the first to third battery accommodating units 110, 120, and 130, respectively, are larger than outer diameters of the first to third accommodated batteries 310, 320, and 330. The first to third battery accommodating units 110, 120, and 130 are formed of a metal material having excellent thermal conductivity, and heat generated by the battery accommodated in each battery accommodating unit is transferred to the outside through the metal holder 150. For example, the metal holder 150 may include aluminum (Al).

The connecting unit 140 illustrated in FIG. 6 may be substantially integrally formed with the first to third battery accommodating units 110, 120, and 130. For example, as illustrated in FIG. 6, the first to third battery accommodating units 110, 120, and 130 may be arranged in parallel to each other, with the connecting unit 140 having a flat shape that is tangent to, e.g., each of, the first to third battery accommodating units 110, 120, and 130.

As further illustrated in FIG. 6, the first to third battery accommodating units 110, 120, and 130 include coupling recesses 116, 126, and 136, respectively, at boundaries coupled with the insulating holders 210, 220, 230, 260, 270, and 280, respectively. A coupling part of the insulating holder is inserted into the coupling recesses 116, 126, and 136 of the first to third battery accommodating units 110, 120, and 130, thereby preventing the insulating holder from being rotated.

However, FIG. 6 illustrates only the coupling recesses 116, 126, and 136 provided at the boundaries of the front sides of the battery accommodating units 110, 120, and 130. The battery accommodating units 110, 120, and 130 may also be provided with coupling recesses at boundaries at an opposite side, i.e., rear sides, of the battery accommodating units 110, 120, and 130.

Figure 4:
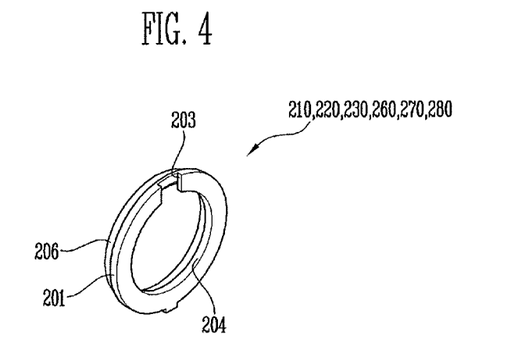
FIG. 4 illustrates a front perspective view of an insulating holder in the embodiment of FIG. 1.
Figure 5:
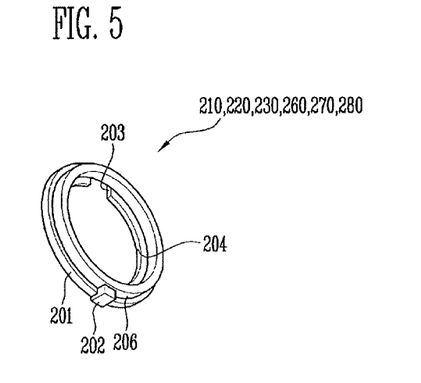
FIG. 5 illustrates a rear perspective view of the insulating holder of FIG. 4.

FIG. 4 is a front perspective view of an insulating holder, and FIG. 5 is a rear perspective view of the insulating holder of FIG. 4. The plurality of insulating holders includes first and fourth insulating holders 210 and 260 coupled at the sides of the first electrode terminal 311 and the second electrode terminal of the first battery 310, respectively, second and fifth insulating holders 220 and 270 coupled at the sides of the second electrode terminal 322 and the first electrode terminal of the second battery 320, respectively, and third and sixth insulating holders 230 and 280 coupled at the sides of the first electrode terminal 331 and the second electrode terminal 332 of the third battery 330, respectively. All of the plurality of insulating holders 210, 220, 230, 260, 270, 280 may have the same shape. Hereinafter, the first insulating holder 210 will be described in detail, and the description is equally applied to the second to sixth insulating holders 220, 230, 260, 270, and 280.

Referring to FIGS. 4-5, the first insulating holder 210 includes a step portion 201 formed with an opening 204, and a space maintaining part 206 extended from the step portion 201. For example, as illustrated in FIGS. 4-5, the step portion 201 with the space maintaining part 206 may be integrally formed as a single insulating member to, e.g., completely, surround a perimeter of an end of a battery.

In detail, the first insulating holder 210 generally has a ring shape surrounding a circumference of an end portion provided with the first electrode terminal 311 of the first battery 310. Similarly, each of the second to sixth insulating holders 220, 230, 260, 270, 280 generally has a ring shape surrounding a circumference of an end portion of the battery at a side coupled with the insulating holder.

The step portion 201 is formed to have an outer peripheral edge larger than a diameter than that of the hole 111 of the first battery accommodating unit 110, so that the first insulating holder 210 does not fall into the hole 111 of the first battery accommodating unit 110. A diameter of an opening 204 of the step portion 201 is formed to be smaller than an outer diameter of an end portion of the first battery 310, so that the step portion 201 blocks the end portion of the first battery 310 so as to prevent the first battery 310 from being separated from the first battery accommodating unit 110.

At least a part of the first electrode terminal lead tab 410 connected with the first electrode terminal 311 of the first battery 310 is accommodated in the opening 204 of the step portion 201, as illustrated in FIGS. 1-3. The step portion 201 may further be formed with a guide recess 203, which communicates with the opening 204 and is extended to the outside while passing through the step portion in a radial direction. A width of the guide recess 203 is substantially the same as or slightly larger than a width of the extended tab 411 of the first electrode terminal lead tab 410. The extended tab 411 of the first electrode terminal lead tab 410 may be accommodated in the guide recess 203.

A diameter of an internal surface of the step portion 201 connected with an internal space of the space maintaining part 206 may be the same as a diameter of an internal surface of the space maintaining part 206. That is, a thickness (a length extended in a longitudinal direction of the battery) of the opening 204 may be smaller than a thickness (a length extended in a longitudinal direction of the battery) of an outer peripheral edge of the step portion 201. In this case, the step portion 201 has two inner diameter having different diameters, i.e., sizes, and the inner diameter adjacent to the external side becomes the opening 204.

Figure 7:
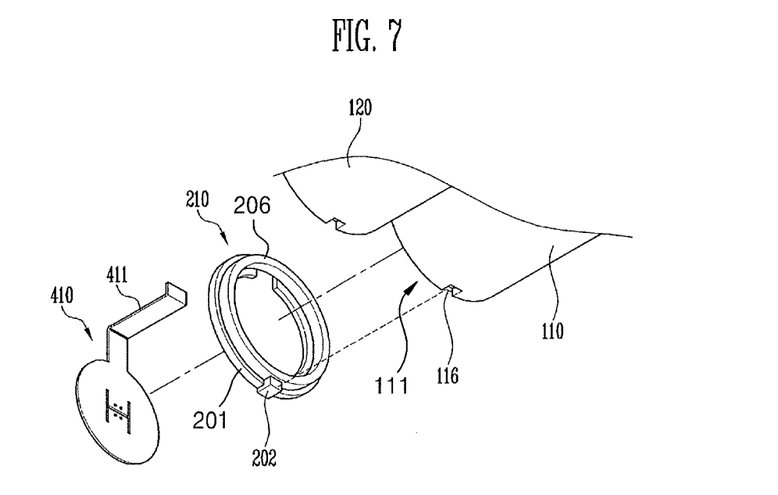
FIG. 7 illustrates a perspective view of a lower portion of the battery pack according the embodiment of FIG. 1.

The first electrode terminal 311 of the first battery 310 coupled to the first insulating holder 210 may be exposed through the first opening 204, and the first electrode terminal lead tab 410 is in contact with the first electrode terminal 311 of the first battery 310 through the opening 204 (FIGS. 3 and 7). Through the configuration, the electrode terminal and the lead tabs, which are in contact with each other through the opening 204, may be connected to each other by welding.

The space maintaining part 206 generally has a ring shape, and is inserted between the first battery 310 and the first battery accommodating unit 110 to serve as a spacer. For example, as illustrated in FIG. 7, when the insulating holder 210 is coupled to the first battery accommodating unit 110, the space maintaining part 206 is inserted into the hole 111, while the step portion 201 protrudes out of the first battery accommodating unit 110 (FIG. 3).

Figure 8:
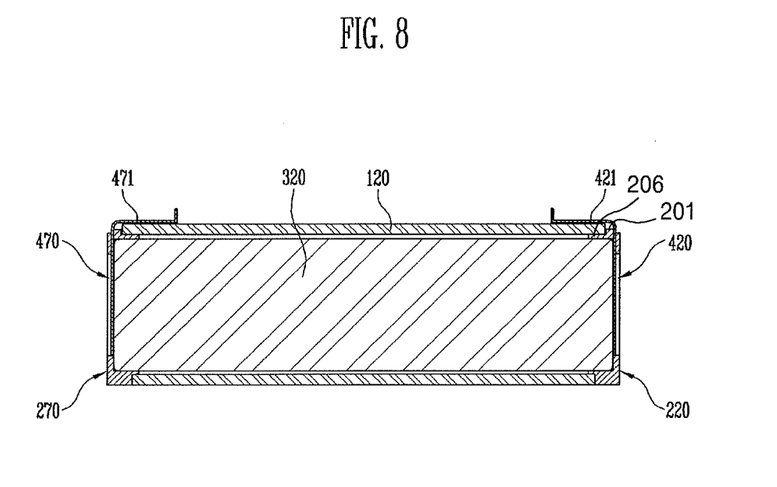
FIG. 8 illustrates a cross-sectional view taken along line of FIG. 1.

For example, referring to FIG. 8, the second battery 320 is accommodated in the hole of the second battery accommodating unit 120. The metal holder 150 is formed of a metal material, so that the second battery 320 and the second battery accommodating unit 120 need to be spaced apart from each other. To this end, the second insulating holder 220 is coupled to an end of the first electrode terminal side and the fifth insulating holder 270 is coupled to an end of the second electrode terminal side of the second battery 320, so that the second battery 320 maintains a space via the space maintaining part 206 of each of the second and fifth insulating holders 220 and 270 so as not to be in directly contact with the second battery accommodating unit 120.

Further, as illustrated in FIG. 8, the first connection lead tab 470 connected to the second electrode terminal of the second battery 320 and the second connection lead tab 420 connected to the first electrode terminal of the second battery 320 are extended to the outside via the extended tabs 421 and 471, respectively, while passing through the openings 204 and the guide recesses 203 of the fifth and second insulating holders 270 and 220, respectively.

Referring to FIG. 5, a coupling part 202 coupled with the metal holder 150 is a rib protruding from the outer peripheral edge of the first insulating holder 210 to the outside in the radial direction. The coupling recess, into which the coupling part is inserted, is formed in the boundary (or the entrance) of each of the holes 111, 121, and 131 of the first to third battery accommodating units 110, 120, and 130, which has been described above.

For example, referring to FIG. 7, the coupling recess 116 is formed at the boundary of the hole of the first battery accommodating unit 110, and the coupling part 202 of the first insulating holder 210 is fitted into the coupling recess 116 of the first battery accommodating unit 110. The coupling recess is identically formed at the boundary of the hole 111 of the first battery accommodating unit 110, and the coupling part 202 of the fourth insulating holder 260 is fitted into the coupling recess 111 of the first battery accommodating unit 110. By the configuration, the plurality of insulating holders 210, 220, 230, 260, 270, 280 is prevented from being rotated.

In the present embodiment, a pair of insulating holders among the first to sixth insulating holders 210, 220, 230, 260, 270, and 280 is coupled to the end provided with the first electrode terminal of one battery and the end provided with the second electrode terminal of one battery, respectively, as a separate member, but one insulating holder may also be coupled to each battery.

Figure 9:
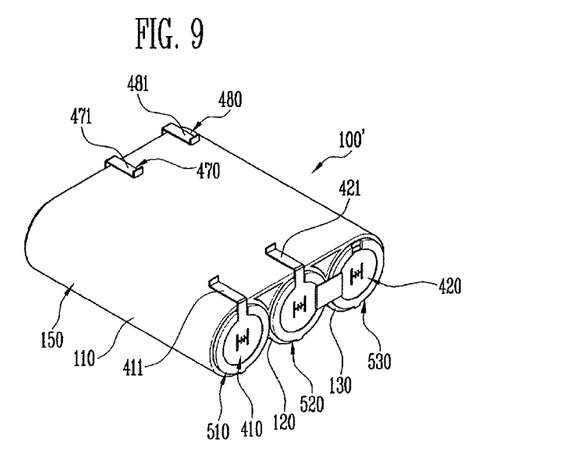
FIG. 9 illustrates a perspective view of a battery pack according to another embodiment of the present disclosure.

A battery pack 100' according to another embodiment of the present disclosure will be described in detail with reference to FIGS. 9 to 12. FIG. 9 illustrates a perspective view of the battery pack 100', FIG. 10 illustrates a perspective view of an insulating holder provided in the battery pack 100', and FIG. 12 illustrates a partially exploded perspective view of the battery pack 100'.

Figure 10:
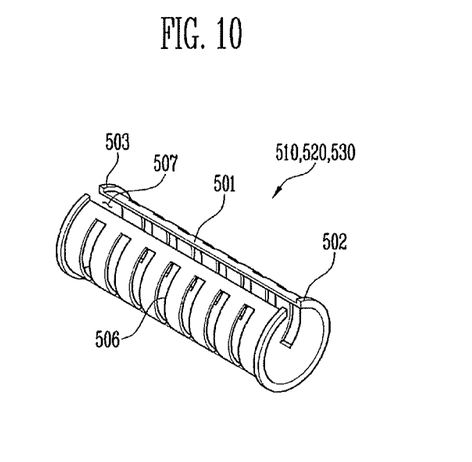
FIG. 10 illustrates a perspective view of an insulating holder provided in the embodiment of FIG. 9.
Figure 12:
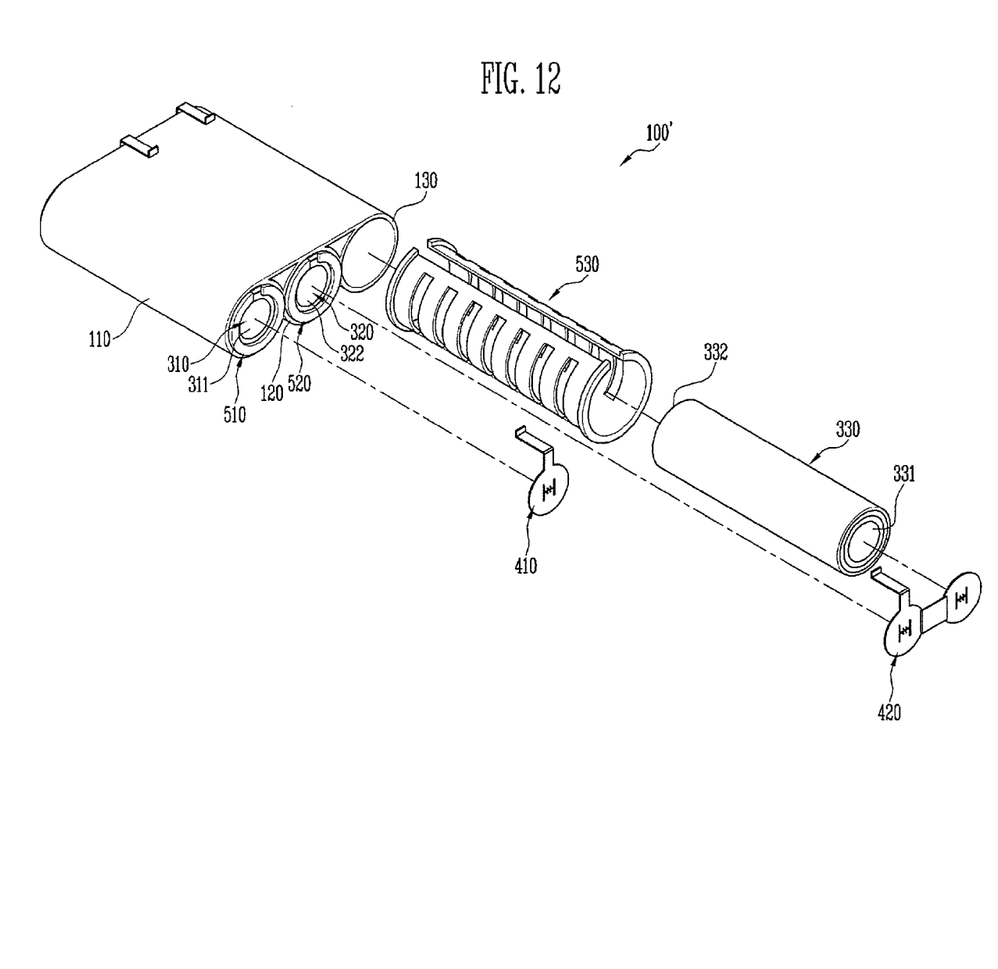
FIG. 12 illustrates a partially exploded perspective view of the battery pack of the embodiment of FIG. 9.

Referring to FIGS. 9-10 and 12, the battery pack 100' according to another embodiment of the present disclosure includes a plurality of batteries 310, 320, and 330, a plurality of lead tabs 410, 420, 470, and 480 electrically connecting the plurality of batteries, the metal holder 150 accommodating the plurality of batteries, and a plurality of insulating holders 510, 520, and 530 making the metal holder 150 and the batteries be spaced apart from each other. The embodiment of FIG. 9 is a case where the insulating holders 510, 520, and 530 are provided to the batteries, respectively, and the metal holder 150, the plurality of batteries 310, 320, and 330, and the plurality of lead tabs 410, 420, 470, and 480 have the same configurations as those of the embodiment of FIG. 1.

Referring to FIGS. 9-10, the plurality of insulating holders 510, 520, and 530 includes a first insulating holder 510 accommodating the first battery 310, a second insulating holder 520 accommodating the second battery 320, and a third insulating holder 530 accommodating the third battery 330. All of the plurality of insulating holders 510, 520, and 530 may have the same shape. Hereinafter, the first insulating holder 510 will be described in detail, and the description is equally applied to the second and third insulating holders 520 and 530.

In detail, as illustrated in FIG. 10, the first insulating holder 510 includes a tube-shaped space maintaining part 501, and step portions 502 and 503 provided at both ends of the first insulating holder 510 in a longitudinal direction of the space maintaining part 501, respectively. The step portions 502 and 503 have ring shapes further extended from boundaries of both ends of the space maintaining part 501 to the outside in a radial direction, and have outer peripheral edges having larger diameters than a diameter of the hole 111 of the first battery accommodating unit 110.

Both ends of the first insulating holder 510 are opened in the longitudinal direction thereof. Spaces surrounded by inner diameters of the step portions 502 and 503 become openings, through which the first electrode terminal lead tab 410 and the first connection lead tab 470 pass, respectively. A first electrode terminal 311 of the first battery 310 may be exposed through the opening of the step portion 502 at a front side of the first insulating holder 510, and the first electrode terminal tab 410 is in contact with the first electrode terminal 311 through the opening. A second electrode terminal (not illustrated) of the first battery 310 may be exposed through the opening of the step portion 503 at a rear side of the first insulating holder 510, and the first connection lead tab 470 is in contact with the second electrode terminal through the opening.

The first insulating holder 510 is provided with an incision portion 507, which is, e.g., continuously, extended in the longitudinal direction of the first battery 310 and communicates with the opening of the first insulating holder 510. The incision portion 507 is extended in the longitudinal direction thereof while passing through the space maintaining part 501 and up to both step portions 502 and 503. A part of the incision portion 507 positioned at both step portions 502 and 503 substantially becomes a guide recess, through which an extended tab 411 of the first electrode terminal lead tab 410 and an extended tab 471 of the first connection lead tab 470 pass.

Figure 11:
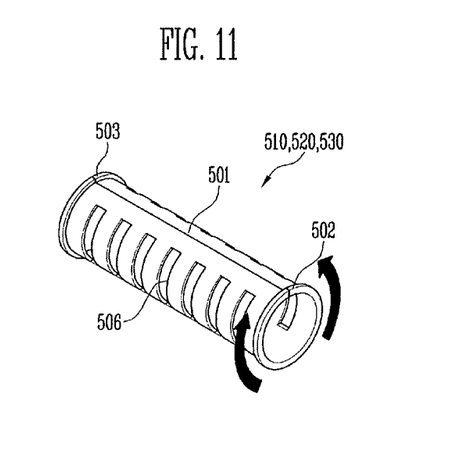
FIG. 11 illustrates a perspective view of a state, in which the insulating holder of FIG. 10 is modified.

The first insulating holder 510 is formed of a material having an insulating property and elastic force (elasticity). For example, an inner diameter of the first insulating holder 510 may be decreased, e.g., by minimizing or eliminating the incision portion 507, as illustrated in FIG. 11. In another example, an inner diameter of the first insulating holder 510 may be increased via the incision portion 507, as illustrated in FIG. 10.

The space maintaining part 501 may further include a plurality of incision portions 506 extended in a circumferential direction, so that heat of the first battery 310 surrounded by the space maintaining part 501 may be easily transferred to the metal holder 150 through empty spaces of the incision portions 506.

The rib-shaped coupling parts 202, which are provided at the insulating holders 210, 220, 230, 260, 270, and 280 of FIG. 5, may be further provided in the step portions 502 at the front sides of the plurality of insulating holders 510, 520, and 530. Further, the metal holder 150 may be provided with the coupling recesses 116, 126, and 136 at boundaries at the front sides of the first to third battery accommodating units 110, 120, and 130, respectively, as illustrated in FIG. 6. In this case, the coupling parts of the plurality of insulating holders 510, 520, and 530 are engaged with the coupling recess of the metal holder 150, so that the insulating holders 510, 520, and 530 may be prevented from being rotated.

By way of summation and review, the present disclosure provides a secondary battery that easily discharges heat. That is, according to embodiments, heat of the secondary battery is transferred to the outside via a metal holder, thereby easily discharging heat.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   a battery with an electrode terminal connected to a lead tab;
   a metal holder to accommodate the battery; and
   an insulating holder spacing apart the metal holder from the battery, the insulating holder including a coupling part, the coupling part coupling between the insulation holder and the metal holder, and the lead tab being connected to the electrode terminal through an opening in the insulating holder,
wherein the insulating holder has a ring shape that at least partially surrounds a circumference of an end of the battery.

2. The battery pack as claimed in claim 1, wherein:
the insulating holder further includes:
   a ring-shaped step portion defining the opening, and
   a ring-shaped space maintaining part extending from the ring-shaped step portion into the metal holder, the ring-shaped space maintaining part being only at an end of the battery and inserted between the metal holder and the battery, and
the coupling part of the insulating holder is a rib protruding outward from the space maintaining part in a radial direction.

3. The battery pack as claimed in claim 2, wherein the metal holder includes a coupling recess, the rib being inserted into the coupling recess.

4. The battery pack as claimed in claim 2, wherein the ring-shaped space maintaining part at least partially surrounds an outer peripheral surface of the battery.

5. The battery pack as claimed in claim 4, wherein the s ring-shaped pace maintaining part includes one or more incision portions to define an empty space between the battery and the metal holder.

6. The battery pack as claimed in claim 5, wherein the one or more incision portions extends in a longitudinal direction or a circumferential direction of the battery.

7. The battery pack as claimed in claim 4, wherein the metal holder has a hole to accommodate the battery, an outer surface of the ring-shaped space maintaining part being in close contact with an inner surface of the hole of the metal holder, and an inner surface of the ring-shaped space maintaining part being in close contact with the battery.

8. The battery pack as claimed in claim 2, wherein the metal holder has a hole to accommodate the battery, the ring-shaped space maintaining part of the insulating holder being fitted into the hole, and the rib protruding from the ring-shaped space maintaining part being coupled to an entrance of the hole.

9. The battery pack as claimed in claim 8, wherein:
an outer peripheral edge of the ring-shaped step portion is larger than a diameter of the hole, and
the rib protruding from the ring-shaped space maintaining part of the insulating holder is inserted into a coupling recess extending from the entrance of the hole along a sidewall of the metal holder.

10. The battery pack as claimed in claim 9, wherein the ring-shaped step portion includes a guide recess, which communicates with the opening and extends outward to the outer peripheral edge in a radial direction, and the lead tab is accommodated in the opening and the guide recess.

11. The battery pack as claimed in claim 10, wherein the ring-shaped space maintaining part has a continuous ring shape communicating with the opening.

12. The battery pack as claimed in claim 10, wherein the ring-shaped space maintaining part has a tube shape with a first incision portion, which extends in a longitudinal direction of the ring-shaped space maintaining part and communicates with the guide recess.

13. The battery pack as claimed in claim 12, wherein the ring-shaped space maintaining part further includes a second incision portion extending in a circumferential direction.

14. The battery pack as claimed in claim 9, wherein the ring-shaped step portion and an additional step portion are provided at a first end adjacent to a first electrode terminal of the battery and a second end adjacent to a second electrode terminal of the battery, respectively.

15. The battery pack as claimed in claim 8, wherein the insulating holder is separately coupled to the hole of the metal holder.

16. The battery pack as claimed in claim 1, wherein the lead tab is external with respect to the metal holder, the lead tab being directly connected to the electrode terminal through the opening in the insulating holder.

17. The battery pack as claimed in claim 1, wherein the ring shape of the insulating holder is surrounding the opening, the ring shape overlapping at least a portion of a periphery of an extreme edge of the battery, the opening exposing a center of the extreme edge of the battery, and the lead tab being connected to the electrode terminal through the exposed center of the extreme edge of the battery.

* * * * *